United States Patent
Ueda et al.

(10) Patent No.: US 9,481,173 B2
(45) Date of Patent: Nov. 1, 2016

(54) NOZZLE PLATE, METHOD OF MANUFACTURING NOZZLE PLATE, INKJET HEAD, AND INKJET PRINTING APPARATUS

(71) Applicants: Naoyuki Ueda, Kanagawa (JP); Yuki Nakamura, Tokyo (JP); Yukiko Abe, Kanagawa (JP); Shinji Matsumoto, Kanagawa (JP); Yuji Sone, Kanagawa (JP); Mikiko Takada, Kanagawa (JP); Ryoichi Saotome, Kanagawa (JP)

(72) Inventors: Naoyuki Ueda, Kanagawa (JP); Yuki Nakamura, Tokyo (JP); Yukiko Abe, Kanagawa (JP); Shinji Matsumoto, Kanagawa (JP); Yuji Sone, Kanagawa (JP); Mikiko Takada, Kanagawa (JP); Ryoichi Saotome, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/412,827

(22) PCT Filed: Jul. 19, 2013

(86) PCT No.: PCT/JP2013/070255
§ 371 (c)(1),
(2) Date: Jan. 5, 2015

(87) PCT Pub. No.: WO2014/021200
PCT Pub. Date: Feb. 6, 2014

(65) Prior Publication Data
US 2015/0158300 A1    Jun. 11, 2015

(30) Foreign Application Priority Data
Jul. 31, 2012   (JP) ................. 2012-170502

(51) Int. Cl.
*B41J 2/16* (2006.01)
*B41J 2/14* (2006.01)
*B23P 15/16* (2006.01)

(52) U.S. Cl.
CPC ............. *B41J 2/162* (2013.01); *B23P 15/16* (2013.01); *B41J 2/1433* (2013.01); *B41J 2/1623* (2013.01); *B41J 2/1628* (2013.01); *B41J 2/1631* (2013.01);
(Continued)

(58) Field of Classification Search
CPC ...... B41J 2/162; B41J 2/1433; B41J 2/1623; B41J 2/1632; B41J 2/1634
USPC ................................ 347/9, 44, 47
See application file for complete search history.

(56) References Cited

U.S. PATENT DOCUMENTS 5,361,087 A * 11/1994 Tajima et al. .................. 347/44
7,449,283 B2   11/2008 Nishi et al.
(Continued)

FOREIGN PATENT DOCUMENTS

EP    0 495 663     7/1992
JP    10-034365    2/1998
(Continued)

OTHER PUBLICATIONS

International Search Report Issued on Aug. 27, 2013 in PCT/JP2013/070255 filed on Jul. 19, 2013.

*Primary Examiner* — Jason Uhlenhake
(74) *Attorney, Agent, or Firm* — Oblon, McClelland, Maier & Neustadt, L.L.P

(57) ABSTRACT

A nozzle plate having a nozzle hole that penetrates through the nozzle plate in a thickness direction is disclosed. The nozzle plate includes a discharge outlet that is formed at the nozzle hole, and provided curvatures of four corner portions of an opening shape of the discharge outlet are denoted as R1, R2, R3, and R4, the opening shape of the discharge outlet is configured to approximate the equation $R1=R2 \geq R3=R4 \approx 0$.

13 Claims, 12 Drawing Sheets

(52) U.S. Cl.
CPC .............. *B41J 2/1632* (2013.01); *B41J 2/1634* (2013.01); *B41J 2/1642* (2013.01); *B41J 2/1646* (2013.01); *B41J 2202/11* (2013.01); *Y10T 29/49401* (2015.01)

(56) References Cited

U.S. PATENT DOCUMENTS

2009/0073200 A1* 3/2009 Tezuka et al. ............... 347/9
2010/0141709 A1 6/2010 Debrabander et al.

FOREIGN PATENT DOCUMENTS

| | | | |
|---|---|---|---|
| JP | 2002-001944 | | 1/2002 |
| JP | 2002001944 A | * | 1/2002 |
| JP | 2004-136656 | | 5/2004 |
| JP | 2004-314619 | | 11/2004 |
| JP | 2005-074635 | | 3/2005 |
| JP | 2007-335460 | | 12/2007 |
| JP | 2012-507417 | | 3/2012 |
| WO | 2005/021269 A1 | | 3/2005 |

* cited by examiner

2[μm]

510[μm]
510[μm]

50[μm]

5[μm]

50[μm]

510[μm]

H
5[μm]

100[μm]

NOZZLE PLATE, METHOD OF MANUFACTURING NOZZLE PLATE, INKJET HEAD, AND INKJET PRINTING APPARATUS

TECHNICAL FIELD

The present invention relates to a nozzle plate having a nozzle hole for discharging liquid, an inkjet head, an inkjet printing apparatus, and a method of manufacturing a nozzle plate.

BACKGROUND ART

In the fields of electronics and displays, electronic circuits and active matrices are conventionally manufactured using a photolithography process. Recently, the so-called printed electronics technology is developing for manufacturing such electronic devices using a printing process. Various printing methods such as micro-contact printing, gravure printing, and screen printing are being considered for use in printed electronics. Inkjet printing is one of such printing methods. The inkjet printing method involves discharging ink droplets from a nozzle of an inkjet head and causing the ink droplets to land on a substrate to be printed. An inkjet head typically includes a nozzle plate and a liquid chamber forming plate. The nozzle plate includes a discharge outlet arranged at a nozzle surface and a nozzle hole corresponding to a hollow portion in connection with the discharge outlet that penetrates through the nozzle plate in the thickness direction. The liquid chamber forming plate is bonded with the nozzle plate to form an ink liquid chamber that is in connection with the nozzle hole corresponding to the hollow portion of the nozzle plate. Such an inkjet head is configured to selectively discharge ink droplets from the discharge outlet by using a drive means to apply a force to an ink meniscus formed at the discharge outlet. The drive means may be implemented by a system using electrostatic force, a system using a piezoelectric element, or a system using thermal element, for example.

In the case of using the inkjet printing method in printed electronics, because wiring of an electronic circuit is printed, a high resolution ranging from about a submicron to 10 μm is required. In view of such a requirement, the diameter of the discharge outlet formed on the nozzle plate needs to be less than or equal to 10 μm. Accordingly, various techniques have been proposed relating to the shapes and manufacturing methods of nozzle plates of inkjet heads. For example, Japanese Laid-Open Patent Publication No. 10-034365 (Patent Document 1) discloses a method of manufacturing a nozzle plate that involves irradiating a laser beam on the surface of a substrate that is to become a nozzle plate in its thickness direction. By irradiating the laser beam in the thickness direction of the substrate, portions of the substrate irradiated by the laser beam are melted so that a through hole reaching the rear face of the substrate is formed. In this way, a nozzle plate having a discharge outlet formed at the surface of the substrate and a nozzle hole corresponding to a hollow portion in connection with the discharge outlet that penetrates through the substrate in its thickness direction to reach the rear face of the substrate may be manufactured.

However, in the nozzle plate manufacturing method disclosed in Patent Document 1, a laser beam is continuously irradiated on the surface of the substrate while the nozzle hole corresponding to a through hole reaching the rear face of the substrate is being formed. As a result, the temperature of the substrate near the surface of the substrate becomes higher than that near the rear face of the substrate and a temperature distribution in the thickness direction is created from the surface of the substrate to the rear face of the substrate. This causes an opening area of the discharge outlet at the surface of the substrate to be larger than the opening area of nozzle hole at the rear face of the substrate. Also, in the case of forming nozzle holes by scanning a laser beam, a discharge outlet pitch may be reduced by densifying the nozzle holes. However, when the pitch is reduced, residual heat from forming a preceding discharge outlet may remain when forming a present discharge outlet so that the temperature of an area near the previously formed discharge outlet may be higher than the remaining areas. As a result, the shape of the present discharge outlet may vary from a desired target shape. Thus, wide variations may be created in the opening areas of the discharge outlets and the opening shapes of the discharge outlets may be irregular and unstable as well. Further, in the case of forming a nozzle hole using a laser beam, the opening shape of the discharge outlets is limited to circular shapes or oval shapes. When ink is discharged from a discharge outlet of a nozzle plate having such an opening shape, ink mists or ink satellites may be formed to thereby hinder high quality printing.

DISCLOSURE OF THE INVENTION

Problems to be Solved by the Invention

It is an object of at least one embodiment of the present invention to provide a nozzle plate including discharge outlets that have opening shapes for enabling high quality printing, the discharge outlets being arranged to have opening areas with reduced variations and stable opening shapes. It is another object of the present invention to provide a method of manufacturing such a nozzle plate. It is a further object of the present invention to provide an inkjet head and an inkjet printing apparatus including such a nozzle plate.

Means for Solving the Problems

According to an embodiment of the present invention, a nozzle plate having a nozzle hole that penetrates through the nozzle plate in a thickness direction is provided. The nozzle plate includes a discharge outlet formed at the nozzle hole, and provided curvatures of four corner portions of an opening shape of the discharge outlet are denoted as R1, R2, R3, and R4, the opening shape of the discharge outlet is configured to approximate the equation $R1=R2 \geq R3=R4 \approx 0$.

Effects of the Present Invention

According to an aspect of the present invention, a surface of a first substrate having a groove formed thereon is bonded with a surface of a second substrate to form bonded substrate so that the groove forms a nozzle hole. Then, the bonded substrate is cut in a direction substantially perpendicular to the longitudinal direction of the groove so that a discharge outlet is formed at the cut surface of the bonded substrate. In one embodiment, by arranging the cross-sectional shape of the groove to be substantially the same throughout its entire length in the longitudinal direction, the opening area and the opening shape of discharge outlets formed by cutting the bonded substrate in the direction substantially perpendicular to the longitudinal direction of the groove at given positions along the longitudinal direction of the groove may be substantially uniform. In one embodiment, provided curvatures of four corner portions of the opening shape of the discharge outlet are denoted as R1, R2, R3, and R4, the groove may be formed so that the opening shape of the discharge outlet approximates the equation R1=R2≥R3=R4≈0. In this way, a nozzle plate that enables high quality printing with reduced ink mists and ink satellites may be manufactured, where variations in the opening area of the discharge outlets is reduced and the opening shape of the discharge outlet is stable.

MODE FOR CARRYING OUT THE INVENTION

In the following, a nozzle plate manufacturing method, a nozzle plate, an inkjet head, and an inkjet printing apparatus according to embodiments of the present invention are described with reference to the accompanying drawings.

In conventional image recording, ink properties such as the viscosity and the surface tension of inks in different colors such as yellow, magenta, and cyan are arranged to be substantially the same. On the other hand, in printed electronics, inks with various physical properties have to be used to accommodate printing at various film thicknesses according to a pattern to be printed such as a wiring, a semiconductor film, or an insulating film. Also, because the solvent of the ink may vary depending on whether an aqueous ink, an organic solvent ink, or an acidic ink is used, for example, the material of the inkjet head needs to be chemically durable. Thus, a nozzle plate according to an embodiment of the present invention is preferably made of a base material that is chemically and physically durable and has a flat and smooth surface. For example, an oxide glass substrate made of $SiO_2$ glass or borosilicate glass, or a single crystal substrate made of quartz, sapphire, or Si may be used.

Figure 1A:
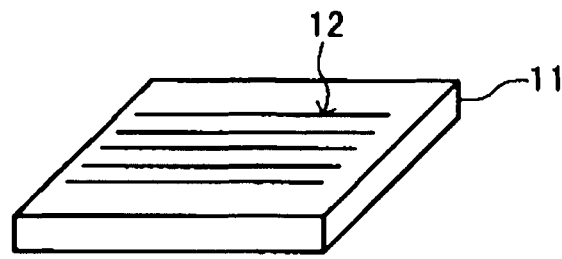
FIGS. 1A-1D are perspective views illustrating process steps for manufacturing a nozzle plate according to a first embodiment of the present invention.

FIGS. 1A-1D are perspective views illustrating process steps for manufacturing a nozzle plate according to a first embodiment of the present invention. Referring to FIG. 1A, in a first process step, a groove 12 in a desired pattern is formed on the surface of a first substrate 11 by a photolithography process. It is noted that a pitch of a groove pattern on a photo mask corresponds to a nozzle pitch of the nozzle plate. In one preferred embodiment, an alignment groove for aligning the nozzle plate may be formed at the outer side of the groove 12 for forming the nozzles. As the material used to transfer the photo mask pattern, a photosensitive resist film or a metal film such as a nickel (Ni) film may be used, for example. In one embodiment, the photo mask pattern may be formed by applying, exposing, and developing a photosensitive resist such as SU-8, and the first substrate 11 may be etched thereafter.

As the etching method, a dry etching method such as reactive-ion etching (RIE) or a wet etching method may be used. It is noted that the shape of the groove 12 may be controlled by the mask pattern and the etching condition. As an optional process step, in the case of forming an electrode film at the nozzle hole, the electrode film may be formed within the groove 12 by a photolithography process after forming the groove 12 on the surface of the first substrate 11. To form the electrode film, a single layer or multiple layers of a metal such as Pt, Au, Ag, Cu, Ni, Cr, Mo, W, Nb, or Ta, an alloy thereof, or a transparent conductive oxide such as ITO, ATO, or AZO may be formed at a thickness of 20-150 nm by sputtering or vacuum vapor deposition and a patterning process may be performed thereafter, for example.

Figure 1B:
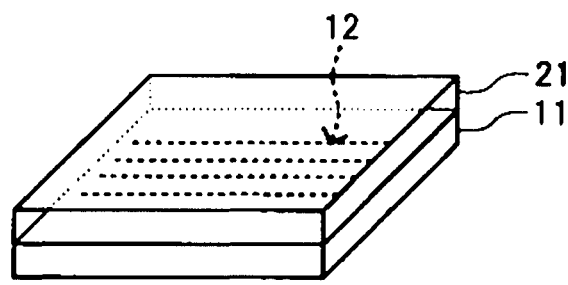
Figure 1C:
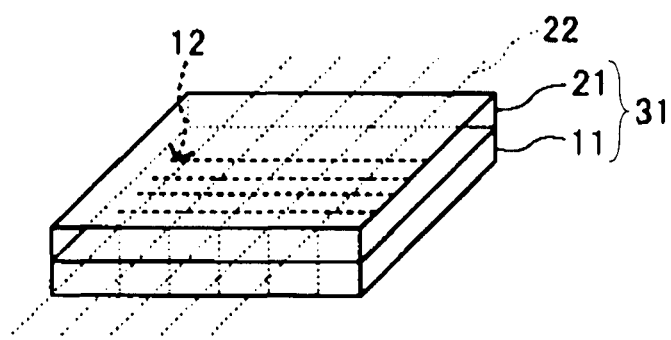
Figure 1D:
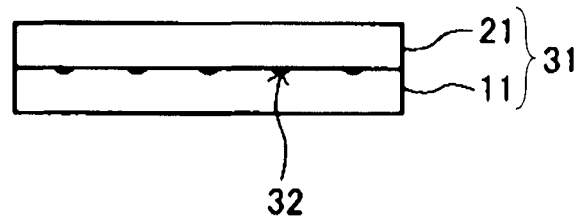

Next, referring to FIG. 1B, in a second process step, the surface of the first substrate 11 having the groove 12 formed thereon is bonded with a flat surface of a second substrate 21. Because the surface of the second substrate 21 is flat, precise positioning of the first substrate 11 with respect to the second substrate 21 may not be necessary. As for the bonding method, conventional techniques such as thermal fusion bonding, anodic bonding, direct bonding, or plasma activation low temperature bonding may be used, for example. Then, referring to FIG. 1C, in a third process step, a bonded plate (nozzle plate) 31 including the first substrate 11 and the second substrate 21 that are bonded together is cut along a cutting line 22 corresponding to a virtual line in an alignment direction (longitudinal direction) of the groove 12 formed on the first substrate 11. It is noted that known devices such as a dicer or a precision cutting machine may be used to cut the bonded plate 31. The cutting width corresponds to a flow path length (nozzle length) L of the nozzle hole, and the nozzle length L may be freely adjusted by changing the cutting width.

Figure 2A:
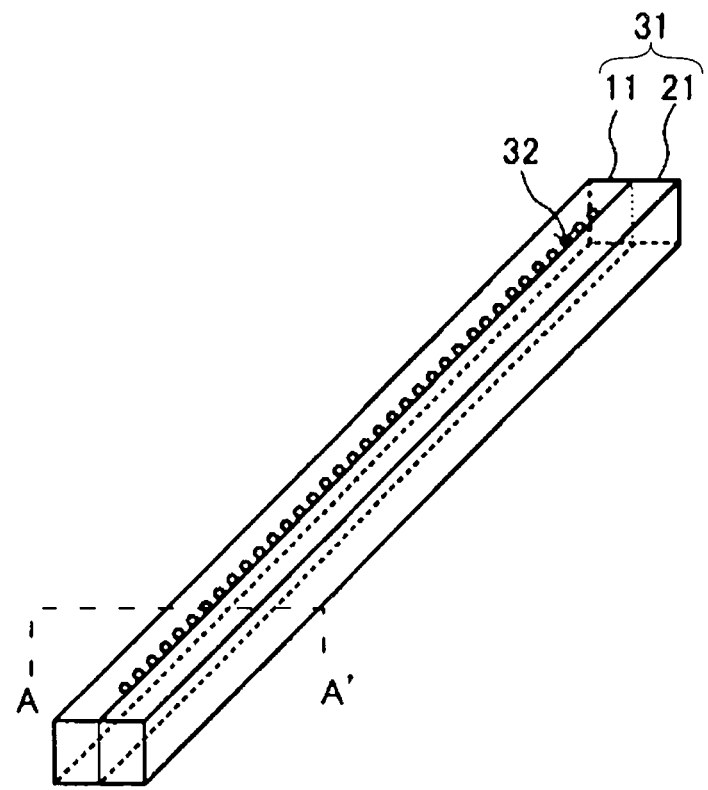
FIG. 2A is a perspective view of the nozzle plate manufactured by the manufacturing method of the first embodiment.
Figure 2B:
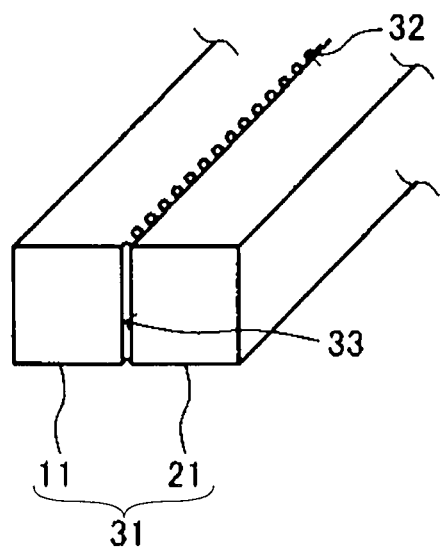
FIG. 2B is a cross-sectional perspective view of the nozzle plate along cutting plane line A-A' of FIG. 2A.

Referring to FIG. 2A, a nozzle face (cut surface) of the nozzle plate manufactured by the process steps of FIGS. 1A-1D has plural discharge outlets 32. Referring to FIG. 2B corresponding to a cross-sectional view of the nozzle plate along cutting plane line A-A' of FIG. 2A, a nozzle hole 33 in connection with the discharge outlet 32 and penetrating through the nozzle plate 31 in the thickness direction is arranged to have a straight configuration. Such a straight nozzle 33 hole may be formed in a case where the width of the groove 12 formed in the first process step illustrated in FIG. 1A is maintained the same.

In certain preferred embodiments, additional process steps such as polishing and cleaning may be performed before, after, or in between the above first through third process steps as is necessary or desired. Also, a liquid-repellent treatment process may be performed on the surface of the nozzle plate. Further, a counterboring process may be performed at the periphery of the discharge outlet after the third process step. Also, although the groove 12 is only formed on the first substrate 11 in the above embodiment, in alternative embodiments, a groove may also be formed on the second substrate 21 and the grooves on the first substrate 11 and the second substrate 21 may be bonded together to form a single groove of the nozzle plate. In this case, the first substrate 11 and the second substrate 21 may have to be positioned with greater precision. Further, although the groove 12 is arranged to have a straight configuration in the above embodiment, in alternative embodiments, the groove 12 may be arranged into a tapered configuration in which the groove width of gradually changes, or the groove 12 may be arranged to have a stepped configuration so that each nozzle plate created by cutting the bonded plate may have a different discharge outlet diameter, for example.

In the present embodiment, the number of discharge outlets and the discharge outlet pitch are determined in the first process step. Because the first process step involves a photolithography process corresponding to a high precision process, productivity may not be affected even when the number of discharge outlets is, increased unlike the case of performing a laser boring process, for example. Thus, the first process step may be advantageously implemented in the case of densifying the discharge outlets. Also, in the present embodiment, an opening area S of the discharge outlet and a configuration of the nozzle hole are determined by the first process step and the second process step. With regard to the processing precision, which is largely determined by the etching precision, because the aspect ratio (width/depth) of the groove is about 1 at the maximum, high precision processing may be enabled in the present embodiment. Thus, the nozzle hole may be arranged into a straight configuration. The nozzle hole length L, which corresponds to the cutting width determined in the third process step, may be freely adjusted by changing the cutting width. For example, in a case where the first substrate 11 has the groove 12 with a length of 100 mm formed thereon, when the nozzle hole length L=100 μm, 1000 nozzle plates may be manufactured, and when the nozzle hole length L=1 mm, 100 nozzle plates may be manufactured. In this way, high productivity may be achieved in the present embodiment. It is noted however, that cutting margins are not taken into consideration in the above example.

The inner wall of the nozzle hole in connection with the discharge outlet and the periphery of the discharge outlet are preferably made of a dielectric material that has high chemical durability. In one preferred embodiment, the nozzle plate itself may be made of an oxide material, such as $SiO_2$ glass, silicate glass, or borosilicate glass, for example. In another embodiment, a structural base may be created with single crystal silicon and a $SiO_2$ film may be formed on a surface including a nozzle flow path by a thermal process, for example. It is particularly noted that in the case where electrostatic force is used as energy (drive means) for discharging ink, the nozzle plate is preferably made of a material that can provide high insulation such as $SiO_2$ glass, sapphire, or quartz, for example.

Figure 3:
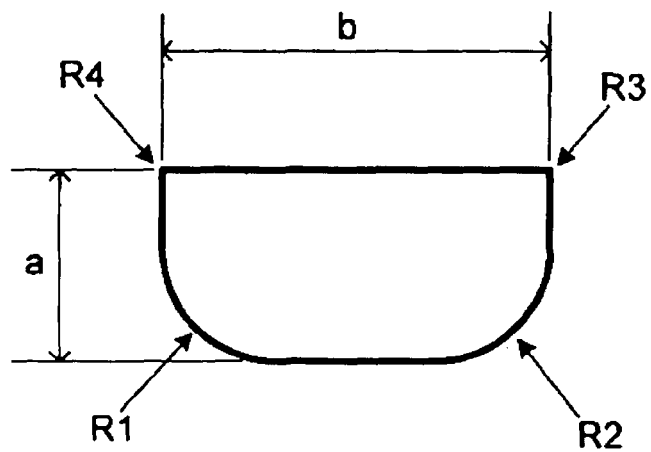
FIG. 3 illustrates an exemplary opening shape of a discharge outlet of the nozzle plate.

FIG. 3 illustrates an exemplary opening shape of the discharge outlet. As illustrated in FIG. 3, the opening shape of the discharge outlet approximates a quadrangle (quad). In the present embodiment, curvatures R1-R4 of the four corners of the quadrangular shape of the discharge outlet are arranged to approximate the equation R1=R2≥R3=R4≈0, and the nozzle hole is arranged to have a straight configuration. The opening area S of the discharge outlet is arranged to be no more than 100 μm$^2$, and the ratio L/S of the length L of the straight portion (nozzle flow path portion) of the nozzle hole to the opening area S of the discharge outlet is arranged to be at least 2 μm$^{-1}$. The ratio L/S may preferably be arranged to be at least 4 μm$^{-1}$, and more preferably at least 10 μm$^{-1}$. It is noted that the opening shape of the discharge outlet is not limited to a quadrangular shape such as that illustrated in FIG. 3, may alternatively be arranged into a polygonal shape with three corners or five corners, for example. Also, it is noted that the outlet discharge opening shape will be a semi-circle when R1=R2=a=b/2.

In an inkjet head for image recording, strict requirement specifications are set up with respect to ink in order to ensure stable recording. For example, in a piezo inkjet head by Ricoh Company, Ltd., the ink viscosity η is 10-12 mPa·s and the surface tension γ is 28-35 mN/m. On the other hand, ink used in the printed electronics may have widely varying ink viscosities η, which may range from about several mPa·s to several hundred mPa·s.

In a case where viscous fluid flows through a circular tube, given certain conditions related to the fluid, the flow rate Q of the fluid may be derived from the following Hagen-Poiseuille equation (1).

$$Q = \frac{\pi a^4 \Delta P}{8 \eta L}$$

In the above equation, "a" represents the radius of the circular tube, "ΔP" represents the pressure difference, "η" represents the ink viscosity, and "L" represents the length of the circular tube.

Given "S" represents the opening area (cross-section area) of the tube and "ΔF" represents the difference in external force, the flow rate Q may be expressed by the following approximate equation (2).

$$Q \propto \frac{S \Delta F}{\eta L}$$

Accordingly, when the ink viscosity range is wide, the ratio L/S has to be suitably adjusted to achieve a desired flow rate Q.

It is noted that in a conventional inkjet head for image recording, the opening diameter of the discharge outlet is about 20 μm, the length of the straight portion of the nozzle hole is about 50 μm, and the ratio L/S cannot be adequately controlled.

After conducting various experimental studies, the present inventors have found that high quality printing with reduced ink mists and ink satellites may be enabled by designing the discharge outlet of a nozzle plate into the opening shape as described above according to the present embodiment. Further, in the present embodiment, the orifice cross-sectional area of a nozzle may be reduced by approximately ¼ or less compared to conventional designs, the nozzle hole length L may be freely adjusted within a range from several dozen micrometers (μm) to several millimeters (mm), and a nozzle plate that can accommodate inks having various physical properties may be manufactured.

Further, in the nozzle plate manufactured according to the nozzle plate manufacturing method of the present embodiment, where plural discharge outlets are formed on the nozzle plate, the standard deviation of structural parameters of the discharge outlets (e.g., lengths and areas) may be maintained within ±3%. Enabling such uniform printing with little deviations may be important in the case of increasing the discharge outlet density in order to increase productivity of the printed matter. It is noted that uniformity of the structural parameters of the discharge outlets may be particularly important in the printed electronics because electrical characteristics may be directly affected by the thickness as well as the in-plane direction of the printed matter.

Also, in the case of using electrostatic force as the discharge energy, all or part of the inner wall surface of the nozzle hole may be covered by metal or a transparent conductive oxide. For example, a metal such as Pt, Au, Ag, Cu, Ni, Cr, Mo, W, Nb, or Ta, an alloy thereof, or a transparent conductive oxide such as ITO, ATO, or AZO may be used. Further, plural layers of such material may be arranged in order to enhance film adhesion, for example.

In discharging ink, the periphery of the discharge outlet is preferably arranged to have adequate liquid-repellency. Conventional techniques may be used to secure such liquid-repellency. For example, a liquid-repellent film made of fluorine resin or silicone resin may be formed on the entire discharge face of the nozzle plate or the periphery of the discharge outlet.

When printing is performed for a long period of time, the nozzle face of the nozzle plate may have to be cleaned. In this case, conventional cleaning techniques may be used such as wiping the nozzle surface of the nozzle plate with rubber to remove excess ink, or vacuuming the ink, for example. In the case of wiping the nozzle face with a blade, the cleaning effect may be further improved by performing a counterboring process at the periphery of the discharge outlet to form a recessed portion.

In the following, specific embodiments of the above nozzle plate and the nozzle plate manufacturing method are described. However, the present invention is not limited to such specific embodiments.

Embodiment 1

Two $SiO_2$ glass substrates (40 mm square, 3 mm thick) were prepared as base materials. An ultrasonic cleaning process was performed on each of the $SiO_2$ glass substrates using a neutral detergent, pure water, and isopropyl alcohol. After drying the $SiO_2$ glass substrates, a UV-ozone process was performed on each of the $SiO_2$ glass substrates at 90° C. for 10 minutes. Then, a photoresist was spin coated on one of the $SiO_2$ glass substrates, and a resist pattern was formed on the $SiO_2$ glass substrate by exposing and developing the photoresist using a predetermined photo mask. As the photoresist pattern, 64 grooves with a width of 1 μm and a length of 30 mm were formed at a pitch of 510 μm. Then, the $SiO_2$ glass substrate was etched using a 40% HF solution to form the grooves at a depth of 2 μm. After rinsing the $SiO_2$ glass substrate with water, the photoresist was removed. Then, the processed surface of the $SiO_2$ glass substrate having the grooves formed thereon and the surface of the other $SiO_2$ glass substrate that has undergone the UV-ozone process were bonded together and heated at 1150° C. for 30 minutes. Then, the bonded structure was cut using a precision cutting machine, and the cut faces were polished to manufacture nozzle plates with a length of 6 mm, a width of 40 mm, and thicknesses of 0.1 mm, 0.3 mm, 0.5 mm, 0.725 mm, 1.0 mm, 1.5 mm, and 2.0 mm.

Embodiment 2

Two $SiO_2$ glass substrates (40 mm square, 3 mm thick) were prepared as base materials. An ultrasonic cleaning process was performed on each of the $SiO_2$ glass substrates using a neutral detergent, pure water, and isopropyl alcohol. After drying the $SiO_2$ glass substrates, a UV-ozone process was performed on each of the $SiO_2$ glass substrates at 90° C. for 10 minutes. Then, a photoresist was spin coated on one of the $SiO_2$ glass substrates, and a resist pattern was formed on the $SiO_2$ glass substrate by exposing and developing the photoresist using a predetermined photo mask. As the photoresist pattern, 64 grooves with a width of 2 μm and a length of 30 mm were formed at a pitch of 510 μm. Then, the $SiO_2$ glass substrate was etched using a 40% HF solution to form the grooves at a depth of 2 μm. After rinsing the $SiO_2$ glass substrate with water, the photoresist was removed. Then, the processed surface of the $SiO_2$ glass substrate having the grooves formed thereon and the surface of the other $SiO_2$ glass substrate that has undergone the UV-ozone process were bonded together and heated at 1150° C. for 30 minutes. Then, the bonded structure was cut using a precision cutting machine, and the cut faces were polished to manufacture nozzle plates with a length of 6 mm, a width of 40 mm, and thicknesses of 0.1 mm, 0.3 mm, 0.5 mm, 0.725 mm, 1.0 mm, 1.5 mm, and 2.0 mm.

Embodiment 3

Two $SiO_2$ glass substrates (40 mm square, 3 mm thick) were prepared as base materials. An ultrasonic cleaning process was performed on each of the $SiO_2$ glass substrates using a neutral detergent, pure water, and isopropyl alcohol. After drying the $SiO_2$ glass substrates, a UV-ozone process was performed on each of the $SiO_2$ glass substrates at 90° C. for 10 minutes. Then, a first photoresist layer was spin coated on one of the $SiO_2$ glass substrates. Thereafter, a second photoresist layer was spin coated on this substrate, and a dual-layer resist pattern was formed on the $SiO_2$ glass substrate by exposing and developing the first and second photoresist layers using a predetermined photo mask. Then, a Ni film with a thickness of 200 nm was deposited by electron-beam evaporation. Thereafter, lift-off was performed to form a pattern of 64 grooves with a width of 2 μm and a length of 30 mm at a pitch of 510 μm. Then, the $SiO_2$ glass substrate at the Ni mask opening portions was etched through reactive ion etching using $CF_4$ gas to form the grooves at a depth of 1 μm. Then, the Ni mask was dissolved using nitric acid and the $SiO_2$ glass substrate was rinsed with water. Then, the processed surface of the $SiO_2$ glass substrate having the grooves formed thereon and the surface of the other $SiO_2$ glass substrate that has undergone the UV-ozone process were bonded together and heated at 1150° C. for 30 minutes. Then, the bonded structure was cut using a precision cutting machine, and the cut faces were polished to manufacture nozzle plates with a length of 6 mm, a width of 40 mm, and thicknesses of 0.1 mm, 0.3 mm, 0.5 mm, 0.725 mm, 1.0 mm, 1.5 mm, and 2.0 mm.

Embodiment 4

Two $SiO_2$ glass substrates (40 mm square, 3 mm thick) were prepared as base materials. An ultrasonic cleaning process was performed on each of the SiO$_2$ glass substrates using a neutral detergent, pure water, and isopropyl alcohol. After drying the SiO$_2$ glass substrates, a UV-ozone process was performed on each of the SiO$_2$ glass substrates at 90° C. for 10 minutes. Then, a photoresist was spin coated on one of the SiO$_2$ glass substrates, and a resist pattern was formed on the SiO$_2$ glass substrate by exposing and developing the photoresist using a predetermined photo mask. As the photoresist pattern, 64 grooves with a width of 1 µm and a length of 30 mm were formed at a pitch of 510 µm. Then, the SiO$_2$ glass substrate at the resist opening portions was etched by reactive ion etching using CHF$_3$ gas to form the grooves at a depth of 3 µm. Then, the reactive gas was changed to O$_2$ to etch and remove the remaining resist. Then, the processed surface of the SiO$_2$ glass substrate having the grooves formed thereon and the surface of the other SiO$_2$ glass substrate that has undergone the UV-ozone process were bonded together and heated at 1150° C. for 30 minutes. Then, the bonded structure was cut using a precision cutting machine, and the cut faces were polished to manufacture nozzle plates with a length of 6 mm, a width of 40 mm, and thicknesses of 0.1 mm, 0.3 mm, 0.5 mm, 0.725 mm, 1.0 mm, 1.5 mm, and 2.0 mm.

Comparative Example 1

A SiO$_2$ glass substrate (20×40 mm, 0.3 mm thick) was prepared as a base material. An ultrasonic cleaning process was performed on the SiO$_2$ glass substrate using a neutral detergent, pure water, and isopropyl alcohol. After drying the SiO$_2$ glass substrate, a UV-ozone process was performed on the SiO$_2$ glass substrate at 90° C. for 10 minutes. Then, aluminum was deposited on the SiO$_2$ glass substrate at a thickness of 100 nm and alignment marks were formed through a normal photolithography process. Then, a trepanning process was performed on the SiO$_2$ glass substrate by focusing the third harmonic of Nd:YAG laser (wavelength 355 nm, pulse width 10 ps, frequency 1 kHz, pulse energy 50 µJ) on the SiO$_2$ glass substrate using a focusing optical system. In this way, a nozzle plate having 32 nozzle holes with a nozzle hole diameter of 5 µm arranged at a pitch of 1020 am was manufactured.

Comparative Example 2

A SiO$_2$ glass substrate (20×40 mm, 0.7 mm thick) was prepared as a base material. An ultrasonic cleaning process was performed on the SiO$_2$ glass substrate using a neutral detergent, pure water, and isopropyl alcohol. After drying the SiO$_2$ glass substrate, a UV-ozone process was performed on the SiO$_2$ glass substrate at 90° C. for 10 minutes. Then, aluminum was deposited on the SiO$_2$ glass substrate at a thickness of 100 nm and alignment marks were formed through a normal photolithography process. Then, a trepanning process was performed on the SiO$_2$ glass substrate by focusing the third harmonic of Nd:YAG laser (wavelength 355 nm, pulse width 10 ps, frequency 1 kHz, pulse energy 50 µJ) on the SiO$_2$ glass substrate using a focusing optical system. In this way, a nozzle plate having 32 discharge outlets with a diameter of 8 µm arranged at a pitch of 1020 µm was manufactured.

Table 1 shown below indicates evaluation results of the nozzle plates manufactured according to the above Embodiments 1-4 (E1-E4) and the Comparative Examples 1-2 (C1-C2).

TABLE 1

| | Number of Discharge Outlets | Pitch [µm] | Discharge Outlet Shape | Discharge Outlet Shape Parameters | | | | |
|---|---|---|---|---|---|---|---|---|
| | | | | a [µm] | b [µm] | R1 = R2 [µm] | R3 = R4 [µm] | D [µm] |
| E1 | 64 | 510 | Quad | 2.0 | 6.6 | 2.0 | 0.0 | |
| E2 | 64 | 510 | Quad | 2.0 | 7.3 | 2.0 | 0.0 | |
| E3 | 64 | 510 | Quad | 2.0 | 7.1 | 2.0 | 0.0 | |
| E4 | 64 | 510 | Quad | 1.0 | 1.0 | 0.1 | 0.0 | |
| C1 | 32 | 1020 | Circle | | | | | 4.9 ± 0.4 |
| C2 | 32 | 1020 | Circle | | | | | 8.7 ± 2.8 |

| | Nozzle Hole Length L | Nozzle Hole Configuration | Surface Quality | Reproducibility | Satellites |
|---|---|---|---|---|---|
| E1 | 0.3, 0.5, 0.725, 1.0, 1.5, 2.0 | Straight | ○ | ○ | Absent |
| E2 | 0.3, 0.5, 0.725, 1.0, 1.5, 2.0 | Straight | ○ | ○ | Absent |
| E3 | 0.3, 0.5, 0.725, 1.0, 1.5, 2.0 | Straight | ○ | ○ | Absent |
| E4 | 0.3, 0.5, 0.725, 1.0, 1.5, 2.0 | Straight | ○ | ○ | Absent |
| C1 | 0.3 | Tapered | Rough, chipped (partially) | △ | Present |
| C2 | 0.7 | Tapered | Rough, chipped (partially) | △ | Present |

Figure 4:
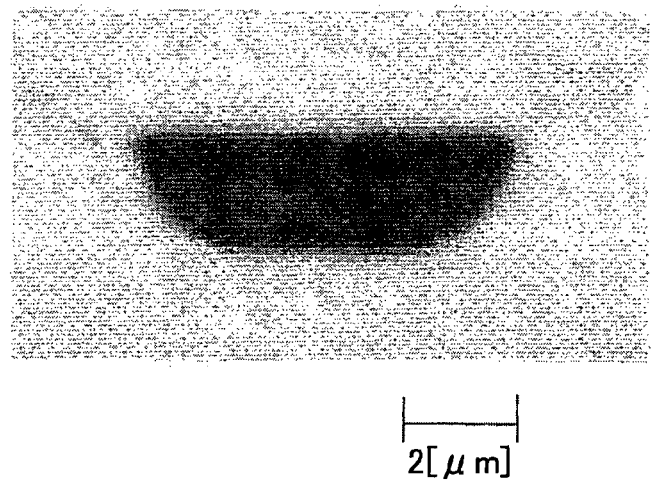
FIG. 4 shows a micrograph of the discharge outlet.
Figure 5A:
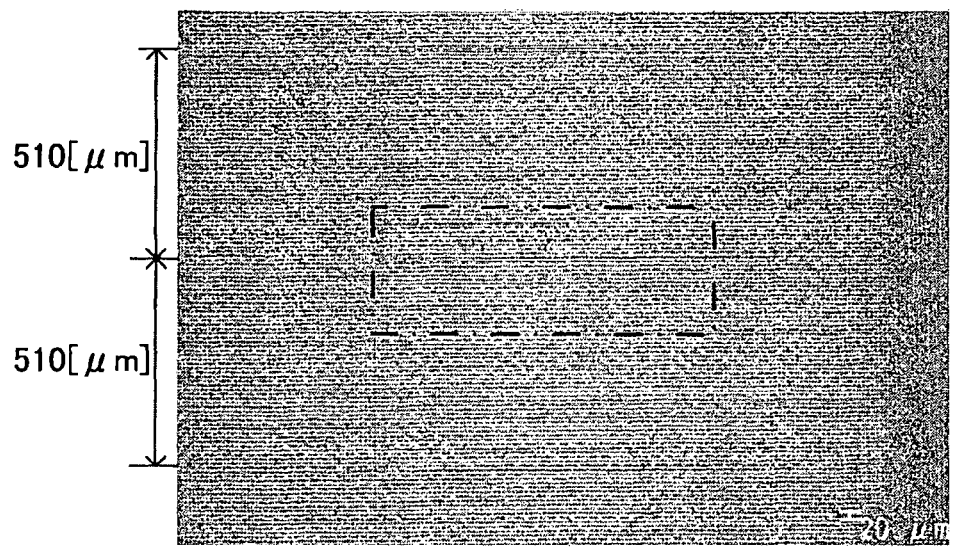
FIGS. 5A and 5B show micrographs of a nozzle hole.
Figure 5B:
Figure 6A:
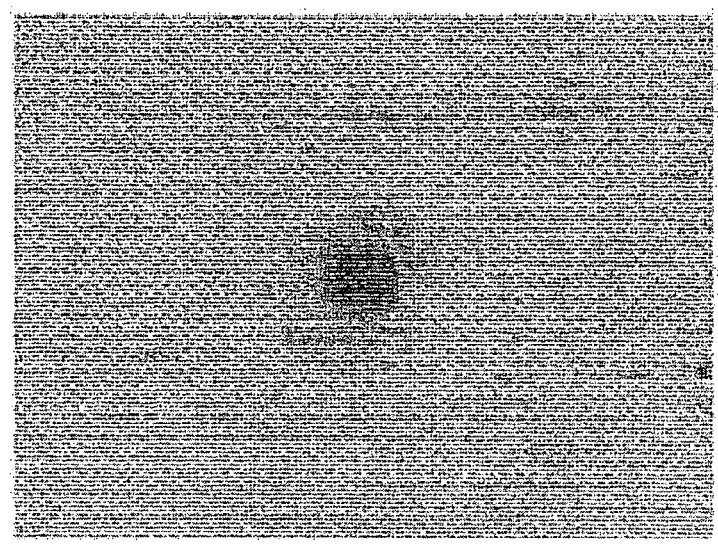
FIGS. 6A and 6B show micrographs of a discharge outlet and a nozzle hole of a nozzle plate according to a comparative example.
Figure 6B:
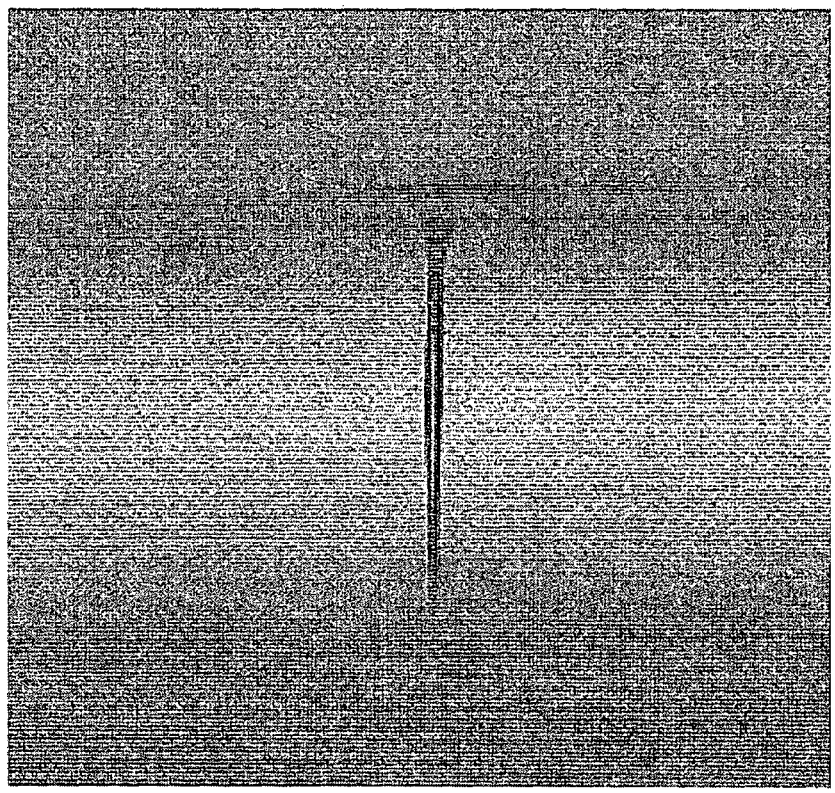

It is noted that the discharge outlet shape parameters "a", "b", "R1", "R2", "R3", and "R4" indicated in the above Table 1 correspond to those illustrated in FIG. 3. As can be appreciated, in Embodiments 1-4, nozzle plates having 64 discharge outlets that are substantially uniform (i.e., having substantially no variations) in shape and size could be manufactured. Also, in Embodiments 1-4, nozzle plates having nozzle flow path portions having straight configurations rather than tapered configurations could be manufactured regardless of the nozzle hole length L. For example, with regard to the nozzle plate manufactured in Embodiment 1, FIG. 4 shows a micrograph of a discharge outlet opening of the nozzle plate of Embodiment 1; FIG. 5A shows a micrograph of a nozzle hole of the nozzle plate of Embodiment 1; and FIG. 5B shows an enlarged view of a portion of FIG. 5A surrounded by a dot-dashed line. As can be appreciated from these drawings, the opening shape of the discharge outlet of the nozzle plate corresponds to the desired target shape, and the nozzle hole also has the desired straight configuration. On the other hand, in Comparative Example 1, the discharge outlet diameter D may deviate from the target at a relatively high error of approximately 8%. Further, when the nozzle hole length L is increased to 0.7 mm as in Comparative Example 2, perforation of a nozzle hole with a diameter of approximately 5 µm becomes difficult so that the discharge outlet diameter D is increased and the error is also increased to approximately 30%. Also, in Comparative Examples 1 and 2, nozzle flow path portions of the nozzle holes are tapered and unstable. For example, as can be appreciated from FIGS. 6A and 6B showing micrographs of a nozzle surface and a nozzle flow path cross-section of the nozzle plate manufactured in Comparative Example 1, the nozzle surface and the periphery of the discharge outlet is rough and partially chipped, and the flow path has a tapered configuration rather than a straight configuration.

In the following, a method of manufacturing an inkjet head according to a second embodiment of the present invention is described.

Figure 7A:
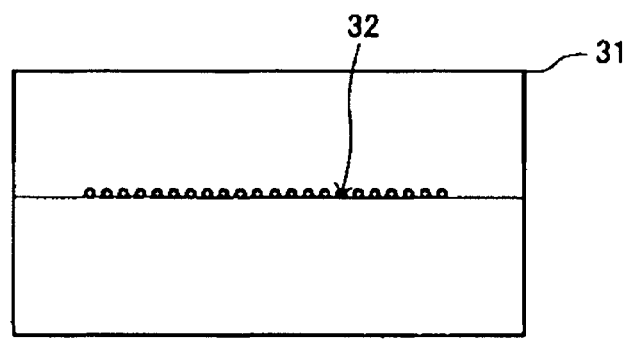
FIGS. 7A-7C illustrate configurations of plates that make up an inkjet head according to a second embodiment of the present invention.
Figure 7B:
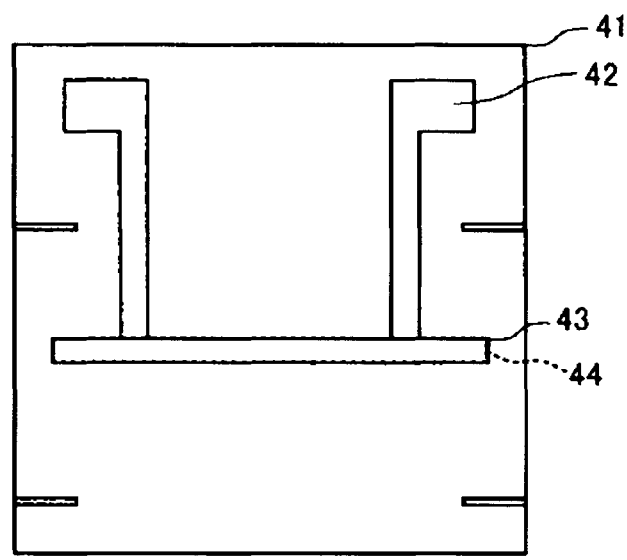
Figure 7C:
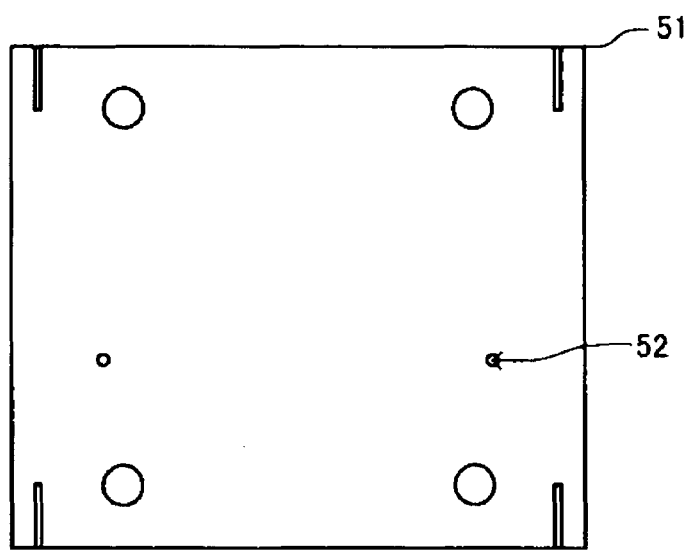
Figure 8A:
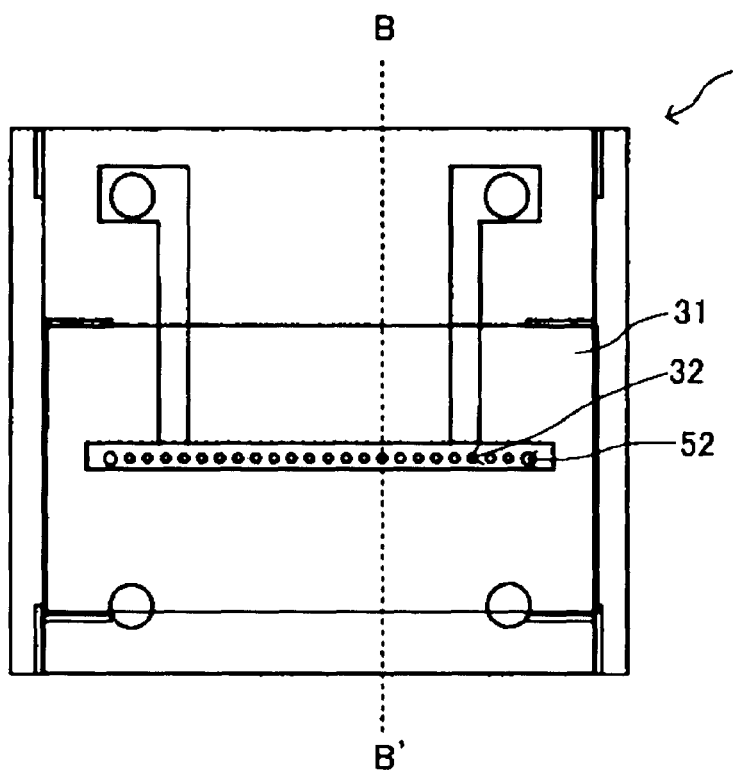
FIG. 8A is a plan view of a bonded plate.
Figure 8B:
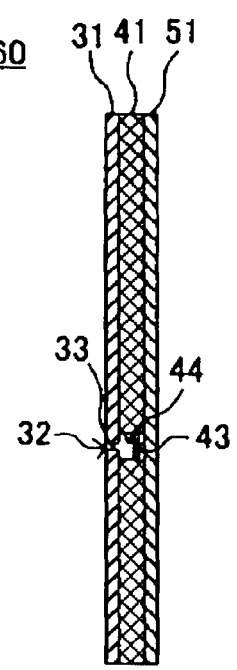
FIG. 8B is a cross-sectional view of the bonded plate along cutting plane line B-B' of FIG. 8A.

In the present embodiment, the nozzle plates of the above Embodiments 1-4 may be used to manufacture an inkjet head. FIGS. 7A-7C illustrate configurations of plates that are included in the inkjet head of the present embodiment. It is noted that the illustrated inkjet head uses electrostatic force as the drive means. FIG. 7A illustrates the nozzle plate 31 having plural discharge outlets 32. In the present embodiment, fluorine-based liquid-repellent material is spin coated on the nozzle surface of the nozzle plate 31. Then, the nozzle plate 31 is dried in an oven at 60° C. for 30 minutes to perform a liquid-repellant treatment process on the surface. FIG. 7B illustrates a flow path plate 41 corresponding to a liquid chamber plate. An Mo film is formed on the flow path plate 41 at a thickness of 200 nm through a metal mask using DC sputtering to form an electrode 42. In this process, an electrode film 43 that is electrically connected to the electrode 42 is formed at the inner wall of a discharge chamber 44. FIG. 7C illustrates an ink inlet plate 51 including an ink inlet 52 for introducing ink from the exterior into the discharge chamber 44. The nozzle plate 31 is arranged along alignment marks formed on the flow path plate 41 and is bonded with the flow path plate 41 using UV cured resin. Further, the ink inlet plate 51 is bonded to the flow path plate 41 using UV cured resin to manufacture a bonded plate 60 as illustrated in FIGS. 8A and 8B.

Figure 9:
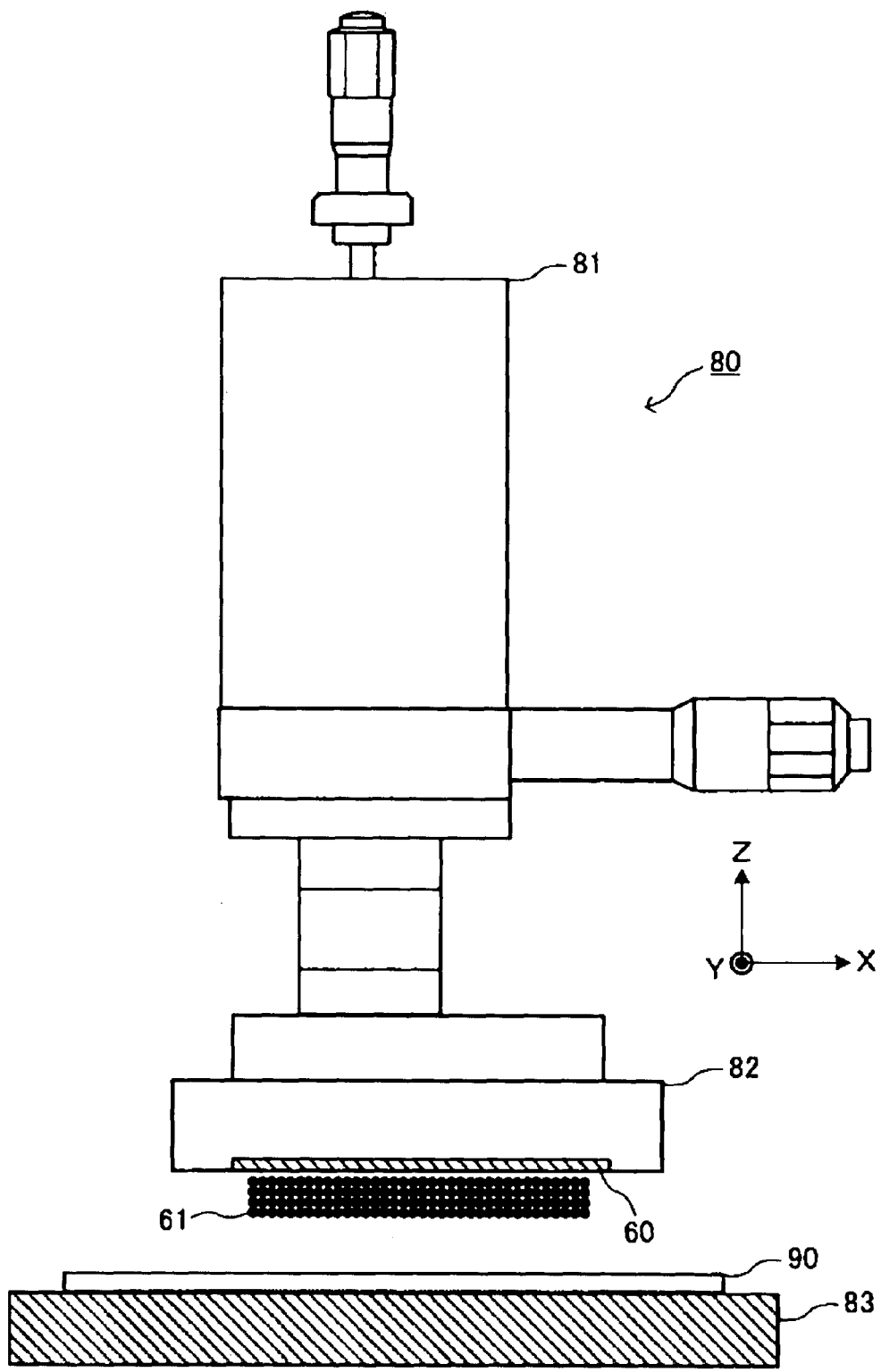
FIG. 9 is a schematic view of the inkjet head according to the second embodiment.

Then, an inkjet head 80 as illustrated in FIG. 9 is manufactured by mounting the bonded plate 60 to a plate holder 82 that is installed in a Zαβ direction position adjustment mechanism 81 and connecting an electrode of the bonded plate 60 to a high voltage pulse amplifier (not shown). It is noted that ink may be introduced into the discharge chamber 44 from the ink inlet 52 beforehand. For example, the ink inlet 52 may be in connection with an ink tank via a tube and ink may be transported from the ink tank to the discharge chamber 44. A voltage from the high voltage pulse amplifier may be applied to the electrode within the bonded plate 60 based on a signal from a higher-level device. In turn, electrically charged ink droplets may be discharged from the nozzle holes by electrostatic force, and the ink droplets may land on the surface of a substrate to be printed 90 that is arranged on a XYZ stage 83.

The inkjet head of the present embodiment includes the nozzle plate 31 and the flow path plate 41. The nozzle plate 31 is manufactured according to the nozzle plate manufacturing method of the above-described first embodiment. The flow path plate 41, which is bonded to the nozzle plate 31, corresponds to a liquid chamber forming plate that forms ink flow paths such as discharge chambers and reservoirs that are arranged to be in connection with the nozzle hole of the nozzle plate 31 by bonding with the nozzle plate 31. The inkjet head of the present embodiment is configured to discharge ink droplets from a selected discharge outlet using the drive means to apply a force to a meniscus formed at the tip of the corresponding nozzle. In one example, a piezoelectric element may be used as the drive means. In this case, the piezoelectric element may be arranged within the discharge chamber, and an electrode that is connected to the piezoelectric element may be extracted outside the discharge chamber to be connected to a pulse power circuit. In another example, electrostatic force may be used as the drive means. In this case, an electrode film may be formed at the inner wall of the nozzle hole as is described above, or the electrode film may be formed on the rear face of the nozzle plate. The electrode film may alternatively be extracted from the discharge chamber to be electrically connected to the pulse power circuit. In yet another example, a thermoelectric conversion element may be used as the drive means. In this case, the thermoelectric conversion element may be arranged within the discharge chamber, and an electrode connected to the thermoelectric conversion element may be extracted outside the discharge chamber to be connected to the pulse power circuit. The inkjet head of the present embodiment also includes the Zαβ direction position adjustment mechanism 81 for adjusting the distance and parallelism between the nozzle face of the nozzle plate 31 and the surface of the substrate to be printed 90. Further, the inkjet head of the present embodiment may include a cleaning mechanism for cleaning the nozzle face of the nozzle plate 31.

Figure 10:
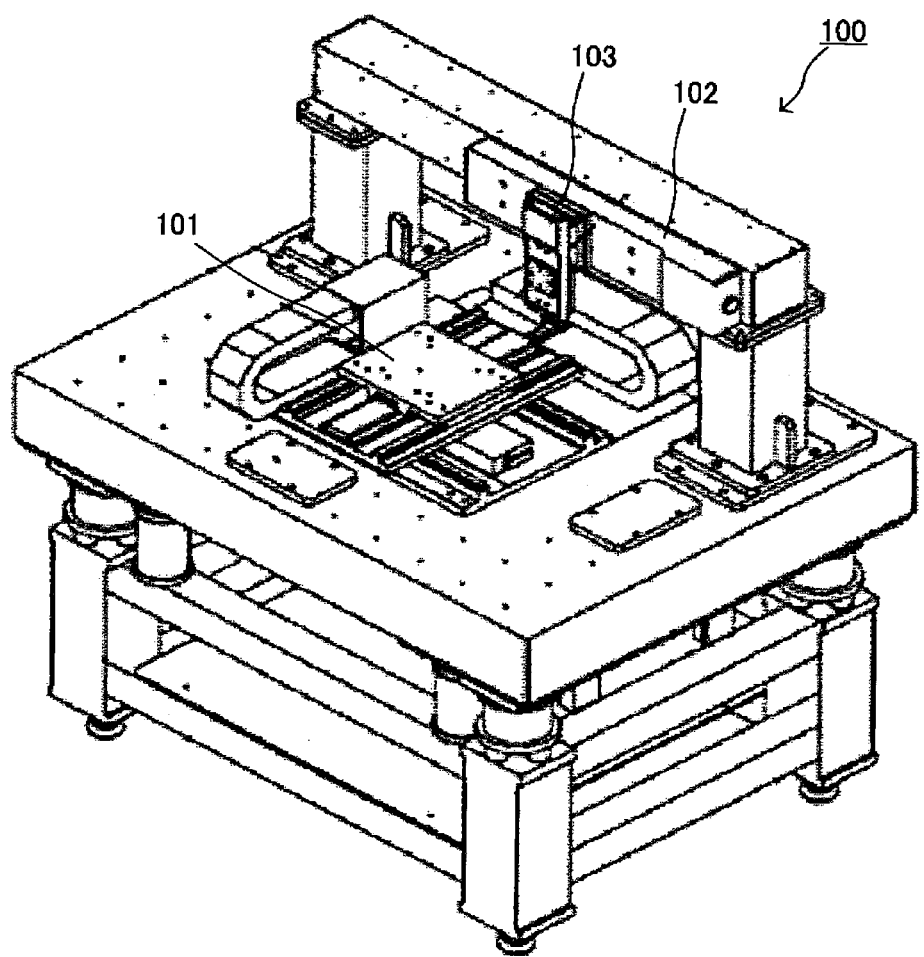
FIG. 10 is a perspective view of an inkjet printing apparatus according to a third embodiment of the present invention.
Figure 11A:
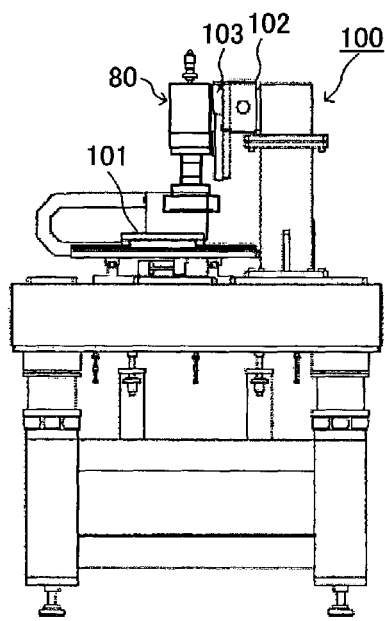
FIG. 11A is a right side view of the inkjet printing apparatus.
Figure 11B:
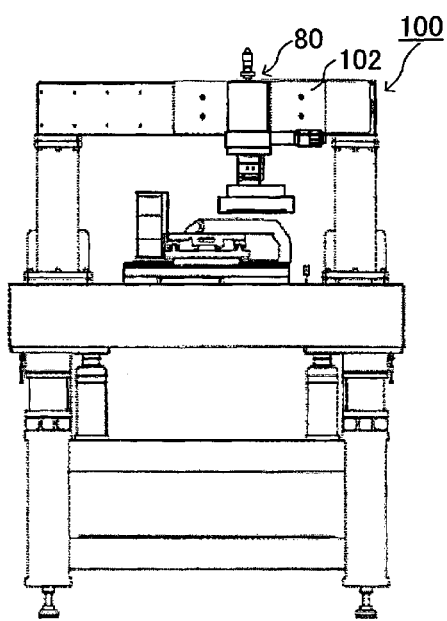
FIG. 11B is a front view of the inkjet printing apparatus.

In the following, as a third embodiment of the present invention, an inkjet printing apparatus including the inkjet head according to the above second embodiment is described. FIG. 10 is a perspective view of an inkjet printing apparatus 100 according to the present embodiment. FIG. 11A is a right side view of the inkjet printing apparatus 100, and FIG. 11B is a front view of the inkjet printing apparatus 100. As illustrated in FIG. 10, the inkjet printing apparatus 100 includes an XY stage 101, a bridge, T-axis adjustment mechanism 102, and a Z-axis adjustment mechanism 103. The XY stage 101 is configured to support a substrate to be printed arranged thereon. The bridge is arranged to straddle across the XY stage 101 like a gate. The T-axis adjustment mechanism 102, which is arranged at the bridge, has the Z-axis adjustment mechanism 103 attached thereto. As illustrated in FIGS. 11A and 11B, the inkjet head 80 is held by a vertical (Z-axis) drive stage of the Z-axis adjustment mechanism 103. The bridge and the XY stage 101 are arranged on a surface plate. A substrate to be printed is arranged on the XY stage 101. In a preferred embodiment, a substrate suction mechanism and a temperature adjustment mechanism are also provided. The XY stage 101 is electrically connected to a drive circuit and is driven by a motion controller corresponding to a higher-level device connected to the drive circuit. The inkjet head 80 is electrically connected to a drive pulse power circuit (not shown) and is driven in conjunction with the XY stage. Print data is input to a computer program, and the motion controller and the drive pulse power circuit are controlled by corresponding output data of the print data. In a further embodiment, a camera for monitoring discharge and/or a camera for alignment may be provided, for example.

It is noted that although a bridge type inkjet printing apparatus has been described above, the present embodiment is not limited to such type of inkjet printing apparatus as long as it functions as an apparatus capable of printing desired data on a substrate by cooperatively controlling discharge operations by the inkjet head and the position of the substrate by a computer program.

Figure 12A:
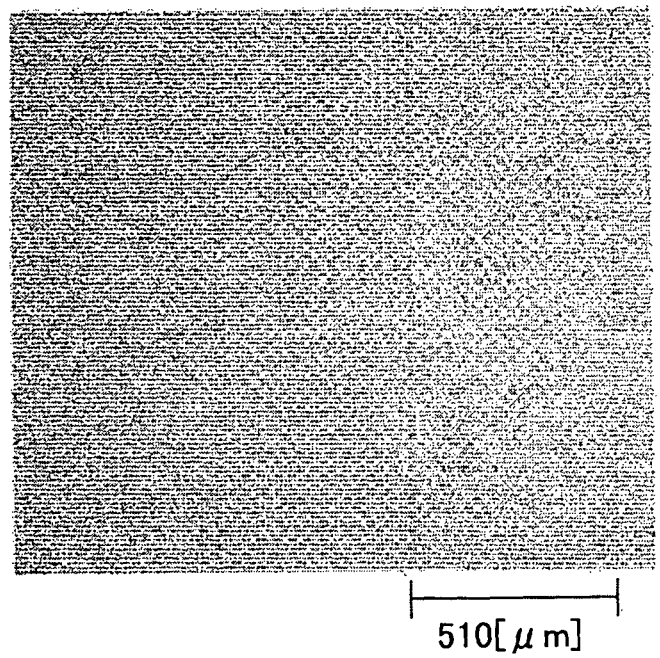
FIGS. 12A and 12B show micrographs of dots printed on a substrate by the inkjet printing apparatus of the third embodiment using the nozzle plate according to the first embodiment.
Figure 12B:
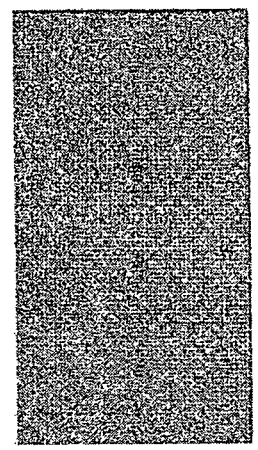
Figure 13:
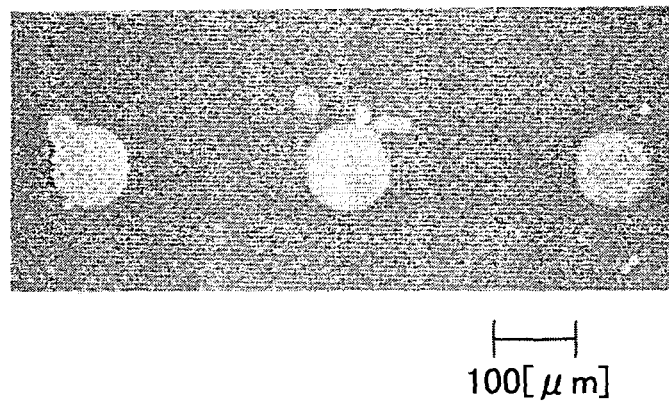
FIG. 13 is a micrograph of dots printed on a substrate by the inkjet printing apparatus of the third embodiment using the nozzle plate of the comparative example.

Using the inkjet printing apparatus manufactured in the above-described manner, various types of inks were discharged to test their discharge performance. In the case where the nozzle plates of the above Embodiments 1-4 were used to discharge the inks, micro droplets less than 1 pL could be successfully discharged by selecting a nozzle plate with a suitable nozzle length L regardless of the ink viscosity. Also, high quality printing substantially free of ink mists and ink satellites could be performed. On the other hand, with the nozzle plates of the above Comparative Examples 1 and 2, because the ratio L/S cannot be adequately increased, even when ink with the recommended viscosity was used, the discharge volume could not be reduced below 1 pL and micro droplets could not be discharged. Also, ink satellites were generated. FIG. 12A is a micrograph showing an exemplary result of discharging ink using the nozzle plate of Embodiment 1 (L=0.725). In this example, a silicon substrate having a thermally oxidized film was used as the substrate to be printed and gold nanopaste NPG-J by Harima Chemicals, Inc. was used as the ink. The inkjet head was driven by a 50-Hz rectangular wave with an applied voltage of 700 V, and scanned at a stage speed of 1 mm/s. As a result, dots successively discharged at intervals of the nozzle pitch 510 μm were formed. FIG. 12B is an enlarged view of the micrograph of FIG. 12A. As can be appreciated from these drawings, no ink mists or ink satellites could be observed, and uniform oval-shaped dots were formed. It is noted that in the present example, the dot radius was 2.8 μm, the dot height was 110 nm, and the discharge volume was 14 fL. FIG. 13 is a micrograph showing an exemplary result of discharging ink using the nozzle plate of Comparative Example 1. In this example, discharge conditions were identical to those of the example illustrated in FIGS. 12A and 12B. In FIG. 13, because the discharge volume was greater than the example of FIGS. 12A and 12B, the dot diameter was increased and ink satellites were generated near the dots.

Although the present invention has been described above with reference to certain preferred embodiments, the present invention is not limited to these embodiments, and numerous variations and modifications may be made without departing from the scope of the present invention.

In the following, various modes of the present invention and their advantages are described.

(Mode 1)

A nozzle plate has a nozzle hole that penetrates through the nozzle plate in a thickness direction. The nozzle plate includes a discharge outlet formed at the nozzle hole, wherein provided curvatures of four corner portions of an opening shape of the discharge outlet are denoted as R1, R2, R3, and R4, the opening shape of the discharge outlet is configured to approximate R1=R2≥R3=R4≈0. In this way, as described above in connection with the first embodiment, a nozzle plate that enables high quality printing with reduced ink mists and ink satellites and stable ink droplet discharge operations may be provided.

(Mode 2)

A nozzle plate has a nozzle hole that penetrates through the nozzle plate in a thickness direction. The nozzle plate includes a first substrate including a bonding surface on which a groove is formed, a second substrate including a surface that is bonded to the bonding surface of the first substrate, and a discharge outlet formed at the nozzle hole. The first substrate and the second substrate are bonded together and cut in a direction substantially perpendicular to a longitudinal direction of the groove formed on the bonding face of the first substrate. The discharge outlet is formed on a cut surface of the first substrate and the second substrate that are bonded together, and provided curvatures of four corner portions of an opening shape of the discharge outlet are denoted as R1, R2, R3, and R4, the opening shape of the discharge outlet is configured to approximate the equation R1=R2≥R3=R4≈0. In this way, as described above in connection with the first embodiment, a nozzle plate that enables high quality printing with reduced ink mists and ink satellites and stable ink droplet discharge operations may be provided.

(Mode 3)

The nozzle plate of Mode 1 or Mode 2 is made of a dielectric material with chemical durability. In this way, as described above in connection with the first embodiment, a nozzle plate with adequate chemical durability that enables high quality printing and stable ink droplet discharge operations may be provided.

(Mode 4)

In the nozzle plate according to any one of Modes 1-3, the nozzle hole includes a nozzle flow path portion that is in communication with the discharge outlet, and the nozzle flow path portion is arranged to have a straight configuration. In this way, as described above in connection with the first embodiment, a nozzle plate that enables high quality printing and stable ink droplet discharge operations may be provided.

(Mode 5)

In the nozzle plate according to any one of Modes 1-4, provided an opening area of the discharge outlet is denoted as S and a length of a nozzle flow path portion of the nozzle hole that is in connection with the discharge outlet is denoted as L, S≤100 μm$^2$ and ratio L/S≥2 μm$^{-1}$. In this way, as described above in connection with the first embodiment, a nozzle plate that enables high quality printing and stable ink droplet discharge operations may be provided.

(Mode 6)

In the nozzle plate according to any one of Modes 1-5, provided an opening area of the discharge outlet is denoted as S and a length of a nozzle flow path portion of the nozzle hole that is in connection with the discharge outlet is denoted as L, S≤100 μm$^2$ and ratio L/S≥4 μm$^{-1}$. In this way, as described above in connection with the first embodiment, a nozzle plate that enables high quality printing and stable ink droplet discharge operations may be provided.

(Mode 7)

In the nozzle plate according to any one of Modes 1-6, provided an opening area of the discharge outlet is denoted as S and a length of a nozzle flow path portion of the nozzle hole that is in connection with the discharge outlet is denoted as L, S≤100 μm$^2$ and ratio L/S≥10 μm$^{-1}$. In this way, as described above in connection with the first embodiment, a nozzle plate that enables high quality printing and stable ink droplet discharge operations may be provided.

(Mode 8)

A method of manufacturing a nozzle plate having a nozzle hole that penetrates through the nozzle plate in a thickness direction includes the steps of forming a groove on a surface of a first substrate, bonding a surface of a second substrate to the surface of the first substrate on which the groove is formed to create a bonded substrate, and cutting the bonded substrate in a direction substantially perpendicular to a longitudinal direction of the groove. In this way, as is described above in connection with the first embodiment, by bonding together the first substrate 11 and the second substrate 21, a nozzle hole 33 may be formed between the bonding faces of these substrates by the groove 12 that formed on a surface of the first substrate 11. By cutting the bonded substrate in a direction substantially perpendicular to the longitudinal direction of the groove 12, the discharge outlet 32 may be formed on a cut surface of the bonded substrate. By arranging the cross-sectional shape of the groove 12 to be substantially the same throughout its entire length in the longitudinal direction, for example, the opening area and the opening shape of the discharge outlets formed by cutting the bonded substrate in the direction substantially perpendicular to the longitudinal direction of the groove at given positions along the longitudinal direction of the groove may be substantially uniform. In this way, a nozzle plate having discharge outlets with reduced variations in the opening area and a stable opening shape may be manufactured.

(Mode 9)

In the nozzle plate manufactured by the method of Mode 8, the nozzle hole includes a discharge outlet formed on a cut surface of the bonded substrate, and provided curvatures of four corner portions of an opening shape of the discharge outlet are denoted as R1, R2, R3, and R4, the opening shape of the discharge outlet is configured to approximate the equation $R1=R2 \geq R3=R4 \approx 0$. In this way, as described above in connection with the first embodiment, a nozzle plate that enables high quality printing with reduced ink mists and ink satellites and stable ink droplet discharge operations may be manufactured.

(Mode 10)

The nozzle plate manufactured by the method of Mode 8 or Mode 9 is made of a dielectric material with chemical durability. In this way, as described above in connection with the first embodiment, a nozzle plate with adequate chemical durability that enables high quality printing and stable ink discharge operations may be manufactured.

(Mode 11)

In the nozzle plate manufactured by any one of the methods of Mode 8-10, the nozzle hole includes a nozzle flow path portion that is in connection with the discharge outlet, and the nozzle flow path portion is arranged to have a straight configuration. As described above in connection with the first embodiment, by arranging the cross-sectional shape of the groove 12 to be substantially the same throughout its entire length in the longitudinal direction, the nozzle hole may be arranged to have a straight configuration. In this way, as described above in connection with the first embodiment, a nozzle plate that enables high quality printing and a stable ink droplet discharge operations may be manufactured.

(Mode 12)

In the nozzle plate manufactured by any one of the methods of Modes 8-11, provided an opening area of the discharge outlet is denoted as S and a length of a nozzle flow path portion of the nozzle hole that is in connection with the discharge outlet is denoted as L, $S \leq 100$ μm$^2$ and $L/S \geq 2$ μm$^{-1}$. In this way, as described above in connection with the first embodiment, a nozzle plate that enables high quality printing and a stable ink droplet discharge operations may be manufactured.

(Mode 13)

In the nozzle plate manufactured by any one of the methods of Modes 8-12, provided an opening area of the discharge outlet is denoted as S and a length of a nozzle flow path portion of the nozzle hole that is in connection with the discharge outlet is denoted as L, $S \leq 100$ μm$^2$ and $L/S \geq 4$ μm$^{-1}$. In this way, as described above in connection with the first embodiment, a nozzle plate that enables high quality printing and a stable ink droplet discharge operations may be manufactured.

(Mode 14)

In the nozzle plate manufactured by any one of the methods of Modes 8-13, provided an opening area of the discharge outlet is denoted as S and a length of a nozzle flow path portion of the nozzle hole that is in connection with the discharge outlet is denoted as L, $S \leq 100$ μm$^2$ and $L/S \geq 10$ μm$^{-1}$. In this way, as described above in connection with the first embodiment, a nozzle plate that enables high quality printing and a stable ink droplet discharge operations may be manufactured.

(Mode 15)

An inkjet head includes at least one of the nozzle plate according to any one of Modes 1-7 or the nozzle plate manufactured by any one of the methods of Modes 8-14, and an ink flow path that is connected to a nozzle flow path portion formed at the nozzle hole of the nozzle plate and is configured to supply ink to the nozzle flow path portion. In this way, as described above in connection with the second embodiment, an inkjet head that enables high quality printing and a stable ink droplet discharge operations may be provided.

(Mode 16)

An inkjet printing apparatus includes an inkjet head of Mode 15, drive means for driving the inkjet head, a scanning unit that is configured to support a substrate to be printed and scan the substrate in an XYZ direction relative to the inkjet head, and a control unit that is configured to process printing pattern data and control the drive means and the scanning means based on the printing pattern data. In this way, as described above in connection with the third embodiment, an inkjet printing apparatus may be provided that is capable of properly printing desired data on a substrate to be printed by controlling discharge operations of the inkjet head and the position of the substrate.

The present application is based on and claims the benefit of priority of Japanese Patent Application No. 2012-170502 filed on Jul. 31, 2012, the entire contents of which are hereby incorporated by reference.

DESCRIPTION OF THE REFERENCE NUMERALS

11: FIRST SUBSTRATE
12: GROOVE
21: SECOND SUBSTRATE
22: CUTTING LINE
31: NOZZLE PLATE
32: DISCHARGE OUTLET
33: NOZZLE HOLE
41: FLOW PATH PLATE
42: ELECTRODE
43: ELECTRODE FILM
44: DISCHARGE CHAMBER
51: INK INLET PLATE
52: INK INLET
60: BONDED PLATE
80: INKJET HEAD
81: Zαβ DIRECTION POSITION ADJUSTMENT MECHANISM
82: PLATE HOLDER
83: XYZ STAGE
90: SUBSTRATE TO BE PRINTED
100: INKJET PRINTING APPARATUS
102: T-AXIS ADJUSTMENT MECHANISM
103: Z-AXIS ADJUSTMENT MECHANISM

The invention claimed is:

1. A nozzle plate having a nozzle hole that penetrates through the nozzle plate in a thickness direction, the nozzle plate comprising:
a discharge outlet formed at the nozzle hole, wherein provided curvatures of four corner portions of an opening shape of the discharge outlet are denoted as R1, R2, R3, and R4, the opening shape of the discharge outlet is configured to approximate R1=R2≥R3=R4≈0, wherein provided an opening area of the discharge outlet is denoted as S and a length of a nozzle flow path portion of the nozzle hole that is in communication with the discharge outlet is denoted as L, S≤100 µm² and ratio L/S≥2 µm⁻¹.

2. The nozzle plate as claimed in claim 1, further comprising:
   a first substrate including a bonding surface on which a groove is formed; and
   a second substrate including a surface that is bonded to the bonding surface of the first substrate, wherein
   the first substrate and the second substrate are bonded together and cut in a direction substantially perpendicular to a longitudinal direction of the groove formed on the bonding face of the first substrate; and
   the discharge outlet is formed on a cut surface of the first substrate and the second substrate that are bonded together.

3. The nozzle plate as claimed in claim 1, wherein a material of the nozzle plate includes a dielectric material with chemical durability.

4. The nozzle plate as claimed in claim 1, wherein the nozzle hole includes a nozzle flow path portion that is in communication with the discharge outlet, and the nozzle flow path portion is arranged to have a straight configuration.

5. The nozzle plate as claimed in claim 1, wherein provided an opening area of the discharge outlet is denoted as S and a length of a nozzle flow path portion of the nozzle hole that is in communication with the discharge outlet is denoted as L, S≤100 µm² and ratio L/S≥4 µm⁻¹.

6. An inkjet head comprising:
   the nozzle plate as claimed in claim 1; and
   an ink flow path that is connected to a nozzle flow path portion formed at the nozzle hole of the nozzle plate and is configured to supply ink to the nozzle flow path portion.

7. An inkjet printing apparatus comprising:
   an inkjet head as claimed in claim 6;
   drive means for driving the inkjet head;
   a scanning unit that is configured to support a substrate to be printed and scan the substrate in an XYZ direction relative to the inkjet head; and
   a control unit that is configured to process printing pattern data and control the drive means and the scanning unit based on the printing pattern data.

8. A method of manufacturing a nozzle plate having a nozzle hole that penetrates through the nozzle plate in a thickness direction, the method comprising the steps of:
   forming a groove on a surface of a first substrate;
   bonding a surface of a second substrate to the surface of the first substrate on which the groove is formed to create a bonded substrate; and
   cutting the bonded substrate in a direction substantially perpendicular to a longitudinal direction of the groove, wherein
   the nozzle hole includes a discharge outlet formed on a cut surface of the bonded substrate, and provided curvatures of four corner portions of an opening shape of the discharge outlet are denoted as R1, R2, R3, and R4, the opening shape of the discharge outlet is configured to approximate R1=R2≥R3=R4≈0,
   provided an opening area of the discharge outlet is denoted as S and a length of a nozzle flow path portion of the nozzle hole that is in communication with the discharge outlet is denoted as L, S≤100 µm² and ratio L/S≥2 µm⁻¹.

9. The method as claimed in claim 8, wherein a material of the nozzle plate includes a dielectric material with chemical durability.

10. The method as claimed in claim 8, wherein the nozzle hole includes a nozzle flow path portion that is in communication with the discharge outlet, and the nozzle flow path portion is arranged to have a straight configuration.

11. The method as claimed in claim 8, wherein provided an opening area of the discharge outlet is denoted as S and a length of a nozzle flow path portion of the nozzle hole that is in communication with the discharge outlet is denoted as L, S≤100 µm² and ratio L/S≥4 µm⁻¹.

12. An inkjet head comprising:
   a nozzle plate manufactured by the method as claimed in claim 8; and
   an ink flow path that is connected to a nozzle flow path portion formed at the nozzle hole of the nozzle plate and is configured to supply ink to the nozzle flow path portion.

13. A nozzle plate having a nozzle hole that penetrates through the nozzle plate in a thickness direction, the nozzle plate comprising:
   a discharge outlet formed at the nozzle hole, wherein provided curvatures of four corner portions of an opening shape of the discharge outlet are denoted as R1, R2, R3, and R4, the opening shape of the discharge outlet is configured to approximate R1=R2≥R3=R4≈0, wherein
   provided an opening area of the discharge outlet is denoted as S and a length of a nozzle flow path portion of the nozzle hole that is in communication with the discharge outlet is denoted as L, S≤100 µm² and ratio L/S≥4 µm⁻¹.

* * * * *